US008657335B2

(12) United States Patent
Borghi

(10) Patent No.: US 8,657,335 B2
(45) Date of Patent: Feb. 25, 2014

(54) STABILIZER DEVICE FOR AN OPERATING MACHINE

(75) Inventor: Giovanni Borghi, Modena (IT)

(73) Assignee: C.M.C. S.r.l.—Societa Unipersonale, Castelfranco Emilia (Modena) (IT)

(*) Notice: Subject to any disclaimer, the term of this patent is extended or adjusted under 35 U.S.C. 154(b) by 0 days.

(21) Appl. No.: 13/576,298

(22) PCT Filed: Feb. 11, 2011

(86) PCT No.: PCT/IB2011/000253

§ 371 (c)(1),
(2), (4) Date: Jul. 31, 2012

(87) PCT Pub. No.: WO2011/101720

PCT Pub. Date: Aug. 25, 2011

(65) Prior Publication Data

US 2012/0299279 A1 Nov. 29, 2012

(30) Foreign Application Priority Data

Feb. 18, 2010 (IT) ............................ MO2010A0032

(51) Int. Cl.
*B60S 9/04* (2006.01)

(52) U.S. Cl.
USPC .................. 280/765.1; 280/764.1; 280/766.1

(58) Field of Classification Search
USPC ..................... 280/763.1, 764.1, 765.1, 766.1
See application file for complete search history.

(56) References Cited

U.S. PATENT DOCUMENTS 3,279,622 A * 10/1966 Person ......................... 212/304
3,638,965 A * 2/1972 Cassady .................... 280/764.1
3,945,666 A * 3/1976 Fritsch ...................... 280/765.1
3,958,813 A * 5/1976 Carey ........................... 280/755
3,985,036 A * 10/1976 Decker et al. ..................... 74/96
4,027,801 A * 6/1977 Johnston et al. ............. 212/304
4,116,467 A * 9/1978 Ewert ........................ 280/764.1
4,118,054 A * 10/1978 Vigerie ...................... 280/765.1
4,124,226 A * 11/1978 Phillips ..................... 280/765.1
4,424,985 A * 1/1984 Holmes ...................... 280/766.1
4,482,287 A * 11/1984 Menzi .......................... 414/694
4,613,276 A * 9/1986 Blatchford .................... 414/542
5,265,995 A * 11/1993 Beck ............................ 414/694
5,383,563 A * 1/1995 Richtsfeld et al. ........... 212/304

(Continued)

FOREIGN PATENT DOCUMENTS

| | | | |
|---|---|---|---|
| EP | 1323871 | A2 | 7/2003 |
| ER | 1 465 606 | A | 1/1967 |
| WO | WO 2009/141840 | A1 | 11/2009 |

*Primary Examiner* — Jeffrey J Restifo
(74) *Attorney, Agent, or Firm* — Arent Fox LLP

(57) ABSTRACT

A first front pair and second rear pair of stabilizer devices associated to the frame of an operating machine, defining, in operative position, a resting base, equal in length to the longitudinal distance between the pairs and equal in width to the transversal distance between the resting feet of each of the latter. Each stabilizer device includes a first and an interconnected second module, one of which is provided with linear elongation means and the other with compass elongation means, the linear and compass elongation means being aimed at being operated in phase relation to define a retracted inactive position, in which the corresponding resting foot is raised from the ground, and a withdrawn operation position, in which said resting foot contacts the ground, at a predetermined distance from the longitudinal midline, such that in this resting base the width distance is at least near to that of the relative length.

5 Claims, 7 Drawing Sheets

(56) References Cited

U.S. PATENT DOCUMENTS

| | | | | |
|---|---|---|---|---|
| 5,431,240 | A * | 7/1995 | Merritt | 180/9.42 |
| 5,488,788 | A * | 2/1996 | Durbin | 37/443 |
| 5,595,398 | A * | 1/1997 | Brown | 280/763.1 |
| 6,076,855 | A * | 6/2000 | Webb | 280/765.1 |
| 6,196,586 | B1 * | 3/2001 | Messenger | 280/763.1 |
| 6,227,569 | B1 * | 5/2001 | Dingeldein et al. | 280/764.1 |
| 6,257,619 | B1 * | 7/2001 | Bender et al. | 280/764.1 |
| 6,390,504 | B1 * | 5/2002 | Fetzer | 280/763.1 |
| 7,197,872 | B2 * | 4/2007 | Satake et al. | 60/484 |
| 7,331,607 | B1 * | 2/2008 | Schneider | 280/766.1 |
| 7,338,077 | B2 * | 3/2008 | Richard | 280/769 |
| 7,364,044 | B2 * | 4/2008 | Hinata | 212/277 |
| 7,419,185 | B2 * | 9/2008 | Richard | 280/763.1 |
| 7,594,679 | B1 * | 9/2009 | Schneider | 280/766.1 |
| 7,802,814 | B2 * | 9/2010 | Lagsdin | 280/763.1 |
| 7,900,962 | B2 * | 3/2011 | Lagsdin | 280/763.1 |
| 7,918,303 | B2 * | 4/2011 | Klas et al. | 180/329 |
| 8,029,020 | B2 * | 10/2011 | Henson et al. | 280/763.1 |
| 2003/0001373 | A1 * | 1/2003 | Slater et al. | 280/763.1 |
| 2007/0284866 | A1 * | 12/2007 | Hanson | 280/763.1 |
| 2008/0048428 | A1 * | 2/2008 | Richard | 280/763.1 |
| 2012/0299279 | A1 * | 11/2012 | Borghi | 280/765.1 |

* cited by examiner

STABILIZER DEVICE FOR AN OPERATING MACHINE

This application is a National Stage entry of International Application PCT/IB2011/000253, filed Feb. 11, 2011, which claims priority to Italian Patent Application No. MO2010A000032, filed Feb. 18, 2010, the disclosure of the prior applications are hereby incorporated in their entirety by reference.

DESCRIPTION OF THE INVENTION

The invention relates to the technical field concerning self-propelled operating machines, for example of the type used in the building industry, agriculture or the like.

Some embodiments include suitable tooling up of a normal truck by installing the operating group on its loading platform, while others include the integral construction of a vehicle, studied purposely to carry a particular equipment and to allow its maximum operational functionality.

For the equipment designed to operate with a stationary vehicle and above a certain height from the ground, such as a lifter arm, there are, for both types of machine considered, stabilizer devices, such as legs and the like, at the same time aimed at:

leveling the machine in horizontal arrangement;

neutralizing the stroke of the suspensions;

increasing, first of all in width, the resting base on the ground to contrast the overturning moment.

FIGS. 1, 2, 3 show, by way of example, an operating machine M of the above mentioned integrated type, provided with a lifter arm having a telescoping arm 1, to which a fork support element 2 is associated.

A turret, provided above the frame 3 of the machine M, is made to rotate by a fifth wheel 4 having a vertical axis, and is aimed at carrying the lifter arm 1 and the operator's cabin 5, which are thus allowed to rotate by 360° in either direction, without solution of continuity (see in particular FIG. 3).

The machine M is provided with two pairs of stabilizer devices, a first pair 6A and a second pair 6P, associated respectively to the front and rear end of the frame 3, crosswise with respect to the latter.

In each pair 6A, 6P, the relative stabilizer devices 61, 62 are set symmetrical, so that the corresponding resting feet 71, 72 are turned outward of the frame 3, in opposite directions with respect to the midline of the latter.

Each of said frame stabilizer devices 61, 62 includes a fixed beam 610, 620, arranged inclined, from which a slip off beam 611, 621 subject to the action of a first hydraulic jack 612, 622.

The resting foot 71, 72 is associated to a second hydraulic jack 613, 623, fastened to the free end of the slip off beam 611, 621.

When said stabilizer devices 61, 62 are in inoperative condition, during transport on the road, the slip off beams 611, 621 are kept inside the relative fixed beams 610, 620 and the feet 71, 72 are kept raised, so that the transverse dimension of each pair 6A, 6P remains within the maximum size limit.

In the operative position, shown in the figures, the slip off beams 611, 621 are pulled out and the feet 71, 72 are lowered, so that the wheels of the machine M are raised from the ground.

FIG. 3 shows the longitudinal distance, indicated with X, between two stabilizer devices, of the first and second pair 6A, 6P, respectively, while the transversal distance between the resting feet 71, 72 of each of the same pairs 6A, 6P, is indicated with Y.

The resting base defined by the feet 71, 72 is thus a rectangle, whose length is equal to the distance X and whose width is equal to the distance Y.

Since the distance Y is considerably smaller than the distance X, the minor stability situation occurs when the lifter arm 1, and consequently, the load carried by the fork support element 2, are oriented crosswise with respect to the frame 3, as illustrated in FIG. 2 and partially, in FIG. 3. For comprehensible safety reasons, the maximum load that can be carried by the lifter arm 1 must be calculated in the most unfavorable condition, so as to prevent the vehicle from overturning.

Therefore, the limited transversal distance Y given by the known stabilizer devices penalizes the machine operative characteristics and, consequently the costs related to its use.

Therefore, it is an object of the present invention to propose a stabilizer device for an operating machine shaped so as to obtain, with an installation similar to that of the known stabilizer devices, an increase of the resting base width, such as to make it at least near to its length.

Another object of the invention is to propose a stabilizer device, capable of cooperating efficiently with other devices of the equipment so as to obtain the exact horizontal arrangement of the operating machine.

A further object of the invention relates to the will to propose a strong stabilizer device, whose operation is reliable and safe.

The characteristic features of the invention will appear clear from the following description of the preferred embodiments of the stabilizer device under discussion, in accordance with the contents of the claims and with help of the enclosed figures, in which:

With reference to the Figures from 1 through 3, an operating machine M has been illustrated, provided with stabilizer devices of known type, mentioned in the introductory note.

Likewise, for the description of the subject invention, an identical integrated operating machine M has been considered, provided with a lifter arm having a telescoping arm 1, to which a fork support element 2 is associated.

Figure 2:
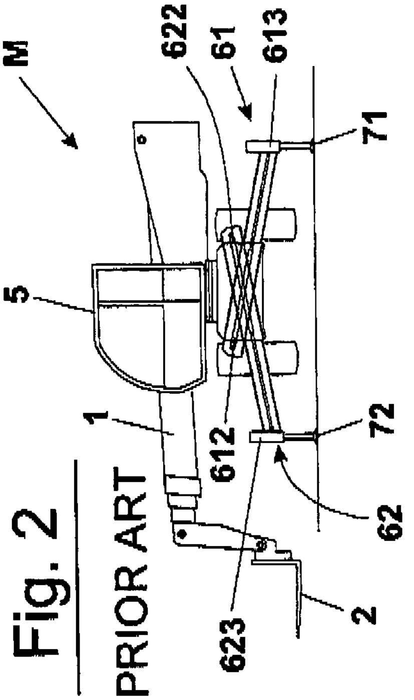
Fig. 2 PRIOR ART
FIG. 2 is a front view of the machine of FIG. 1, with the upper turret in a different position.
Figure 1:
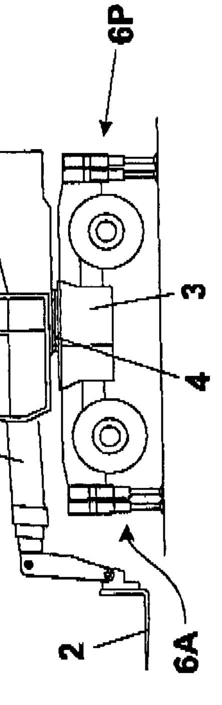
Fig. 1 PRIOR ART
FIG. 1 is a side schematic view of an operating machine, provided with known stabilizer devices in operative position.
Figure 3:
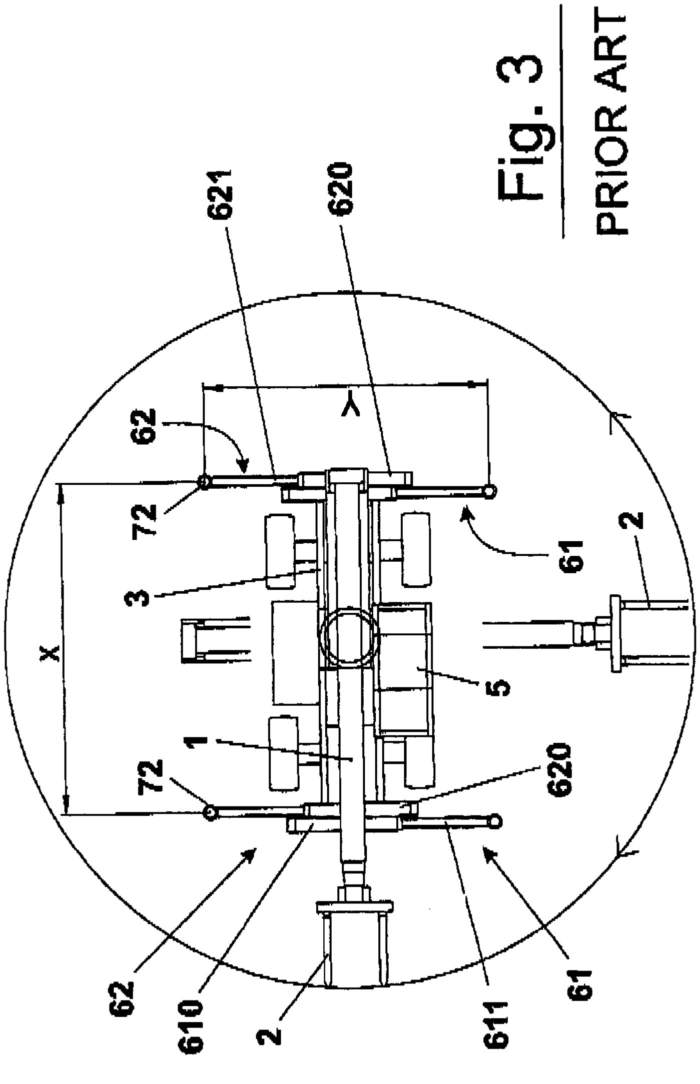
Fig. 3 PRIOR ART
FIG. 3 is a top view of FIG. 1 that points out the rotation of the upper turret and the dimensions of the resting base.
Figure 5:
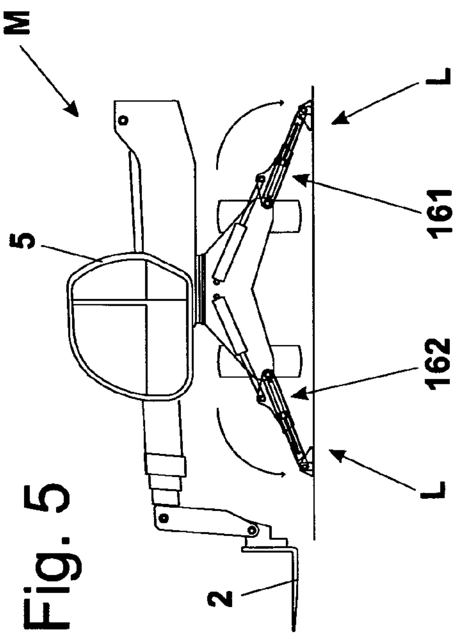
FIG. 5 is a front view of the machine of FIG. 4, with the upper turret in a different position.
Figure 4:
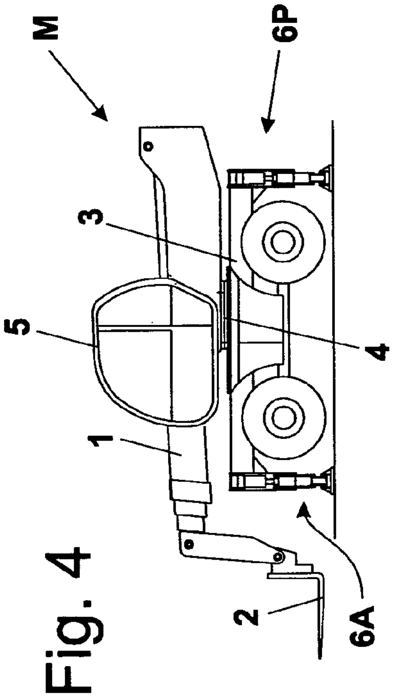
FIG. 4 is a side schematic view of an operating machine, provided with the stabilizer devices under discussion, according to a first embodiment, in operative position.
Figure 6:
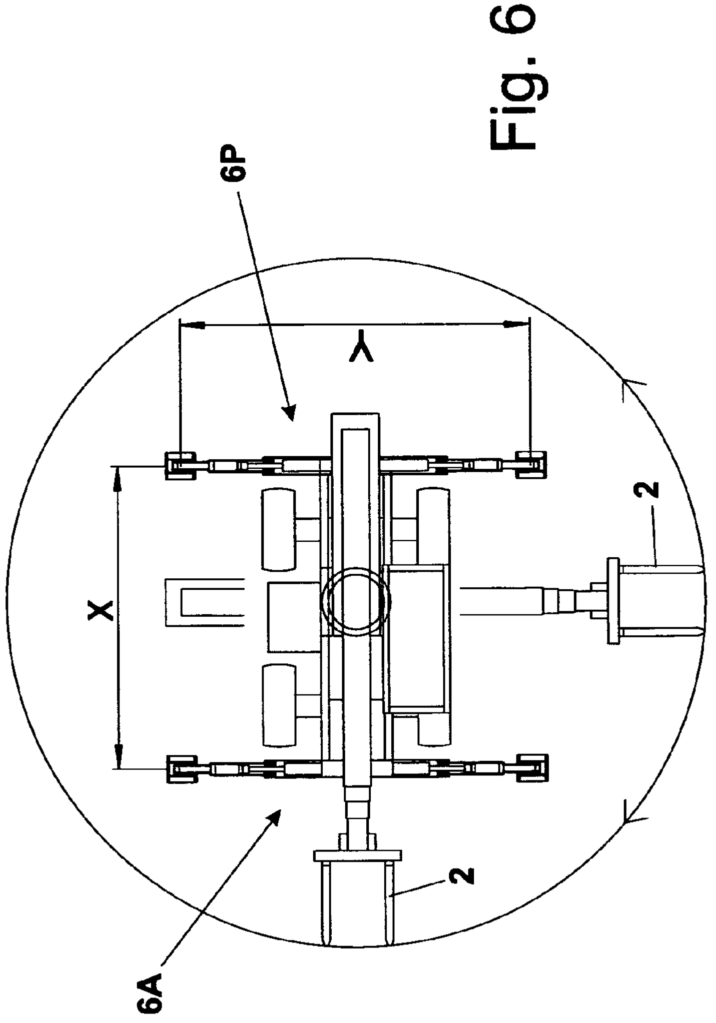
FIG. 6 is a top view of FIG. 4 that points out the rotation of the upper turret and the dimensions of the resting base.
Figure 12:
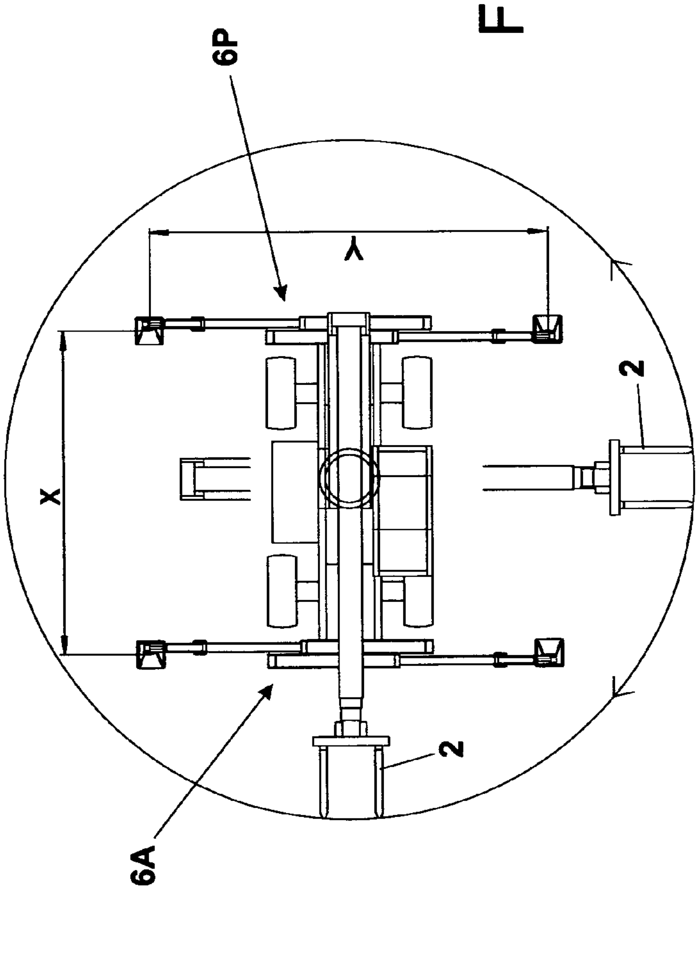
FIG. 12 is a top view of FIG. 10 that points out the rotation of the upper turret and the dimensions of the resting base.
Figure 18:
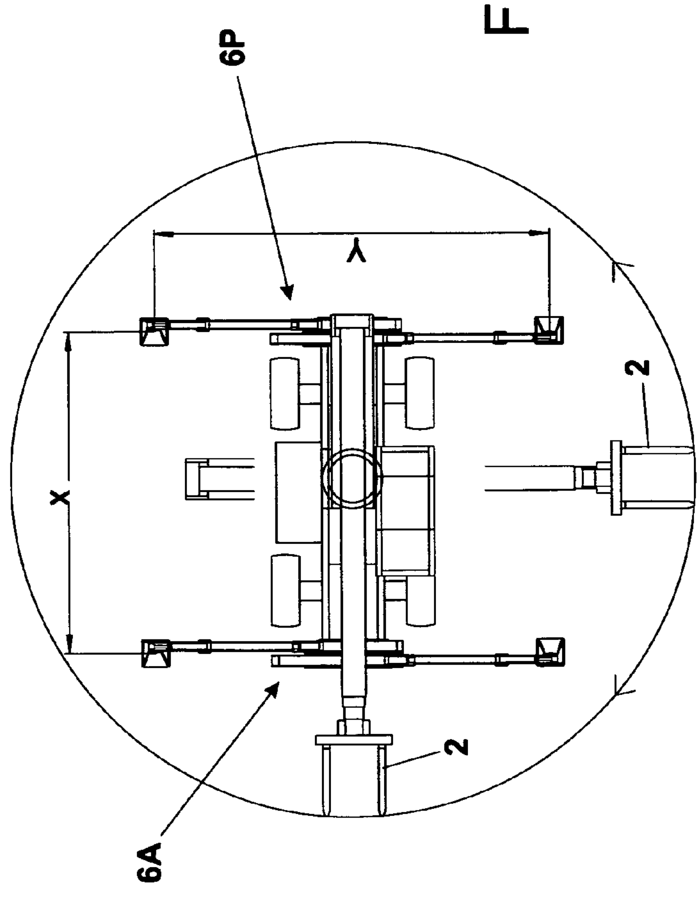
FIG. 18 is a top view of FIG. 16 that points out the rotation of the upper turret and the dimensions of the resting base.

A turret, provided above the frame 3 of the machine M, is made to rotate by a fifth wheel 4 having a vertical axis, and is aimed at carrying the lifter arm 1 and the operator's cabin 5, which are thus allowed to rotate by 360° in either direction, without solution of continuity (see in particular FIGS. 6, 12, 18).

Also in this case, the machine M is provided with two pairs of stabilizer devices, for easier comparison indicated with the same references used in the figures related to prior art.

Therefore, a first and a second pair of stabilizer devices 6A, 6P are defined, associated to the front and rear end of the frame 3 respectively, crosswise with respect to the latter.

In each pair 6A, 6P, the relative stabilizer devices (described in detail later on) are set symmetrical, so that the corresponding resting feet are turned outward of the frame 3, in opposite directions with respect to the midline of the latter. With the stabilizer devices of each pair 6A, 6P in operative position, as it will be better specified later on, a resting base is defined for the machine M, with the raised wheels, as described in the introductory note.

Such resting base has a rectangular shape having a length X equal to the longitudinal distance between the same pairs 6A, 6P, and a width Y equal to the transversal distance between the resting feet of each of the latter ones (see again FIGS. 6, 12, 18).

Figures from 4 through 9 show a first embodiment of the stabilizer devices of each pair 6A, 6P, indicated with references 161, 162.

Figures from 10 through 15 show a second embodiment of the stabilizer devices of each pair 6A, 6P, indicated with references 261, 262.

Figures from 16 through 21 show a variant of the second embodiment of the stabilizer devices of each pair 6A, 6P, indicated with references 361, 362. According to the invention, each of the above mentioned stabilizer devices 161, 162, 261, 262, 361, 362 includes at least a first and a second module 10, 11, interconnected with each other, one of which is provided with linear elongation means 12 and the other is provided with compass elongation means 13.

Said linear 12 and compass 13 elongation means are aimed at being operated in phase relation to define a retracted inactive position R, in which the corresponding resting foot is raised from the ground and the bulk of said stabilizer device 161, 162, 261, 262, 361, 362 is within the above mentioned machine M maximum size limits, and a withdrawn operation position L, in which said resting foot contacts the ground, at a predetermined distance from the longitudinal midline, such that in this resting base the width Y distance is at least near to that of the relative length X, as specified below.

In the above mentioned first embodiment, the first module 10 of each stabilizer device 161, 162 is provided with said compass elongation means 13 and includes a stationary vertical plate 14, set crosswise to the frame 3 of the machine M and to which an arm 15 is articulated, so as to oscillate from a raised position H1 (FIG. 7) to a lowered position H2 (FIGS. 8, 9), due to the action of a respective first actuator 16, for example, a hydraulic jack.

The above mentioned second module 11, which in this case is associated to said arm 15, is equipped with said linear elongation means 12 and includes a slip-off member 17, supported coaxially by the same arm 15 and operated by a respective second actuator 18, for example, a hydraulic jack, between an inner position W1 (FIGS. 7, 8) and an outer position W2 (FIGS. 4, 5, 6, 9).

A resting foot 19, aimed at abutting on the ground, is freely articulated to the end of said slip-off member 17.

In each pair 6A, 6P of the just described stabilizer devices 161, 162, the relative plates 14 are advantageously combined in a single body.

Figure 7:
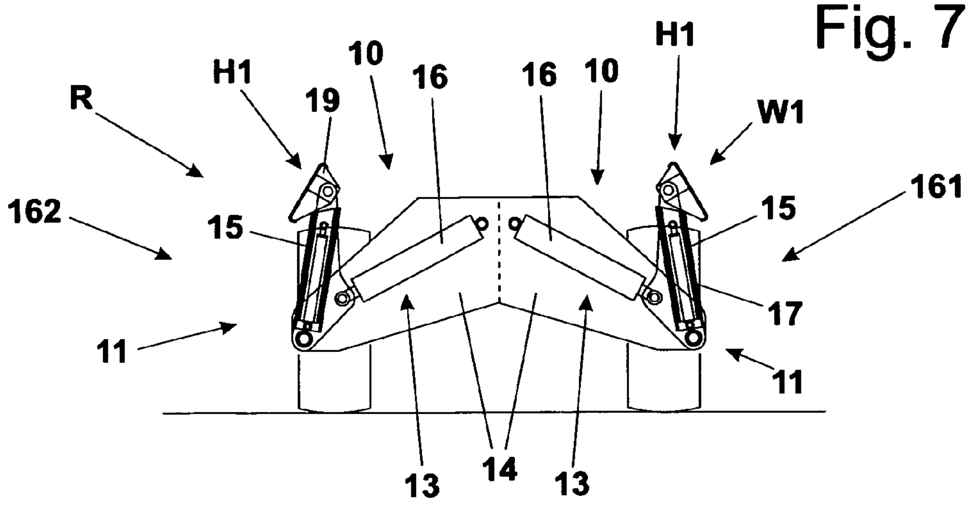
FIG. 7 is a front schematic view of a pair of stabilizer devices like those in FIGS. 4, 5, 6, in rest position.

FIG. 7 shows the above mentioned retracted inactive position R of the stabilizer devices 161, 162, with the respective arms 15 raised in their position H1 and the slip-off members 17 in their inner position W1.

Figure 8:
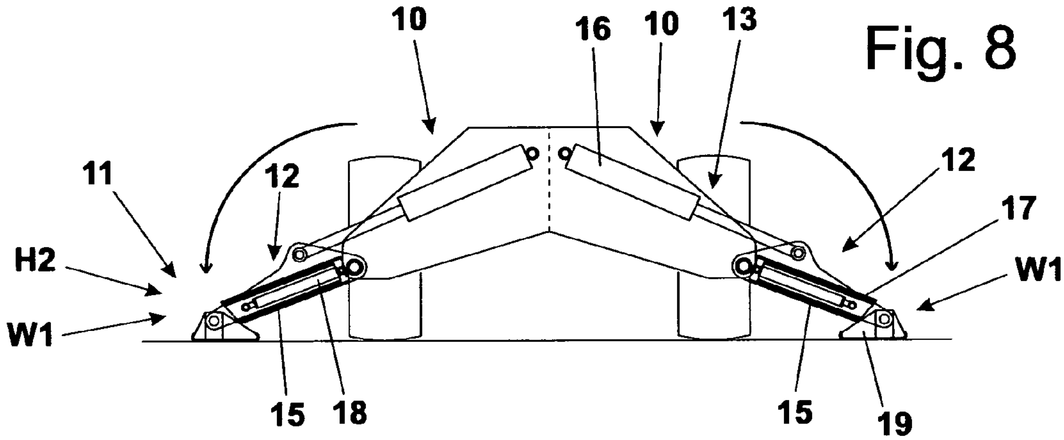
FIG. 8 is a view similar to that of FIG. 7 with the stabilizer devices partially withdrawn.
Figure 9:
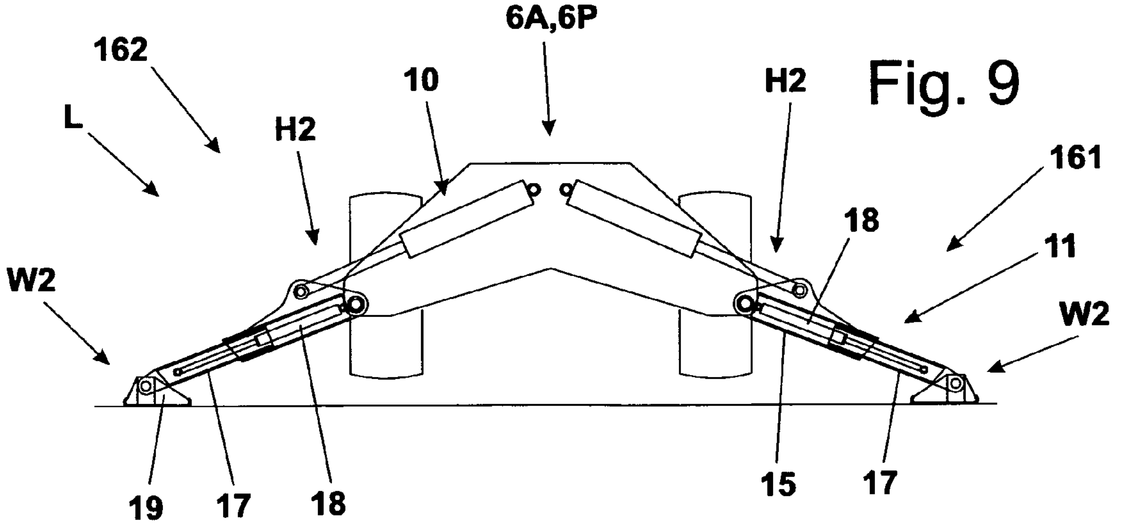
FIG. 9 is a view similar to that of FIG. 7 with the stabilizer devices completely withdrawn.
Figure 10:
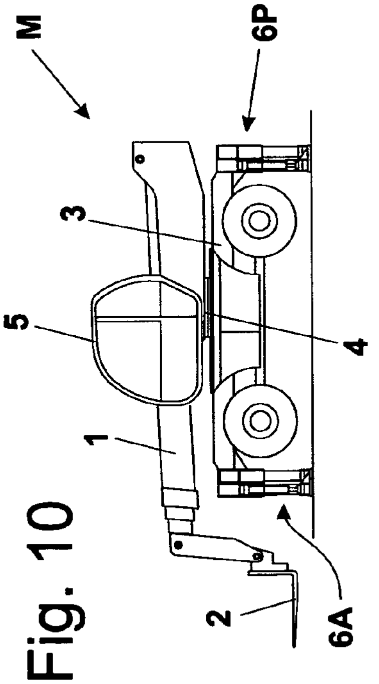
FIG. 10 is a side schematic view of an operating machine, provided with the stabilizer devices under discussion, according to a second embodiment, in operative position.
Figure 11:
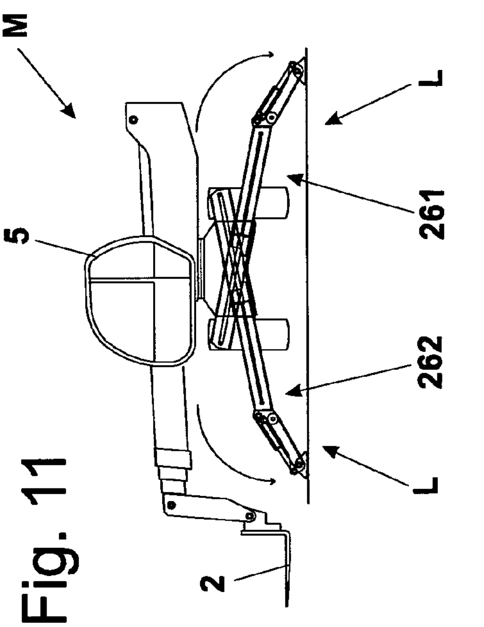
FIG. 11 is a front view of the machine of FIG. 10, with the upper turret in a different position.

FIG. 8 shows an intermediate position between said inactive position R and the operation position L (FIG. 9); in the latter, said arms 15 are in their lowered position H2 and the slip-off members 17 are in their outer position W2.

As it is pointed out in FIG. 6, the width Y of so the defined resting base is bigger than its length X.

Figure 14:
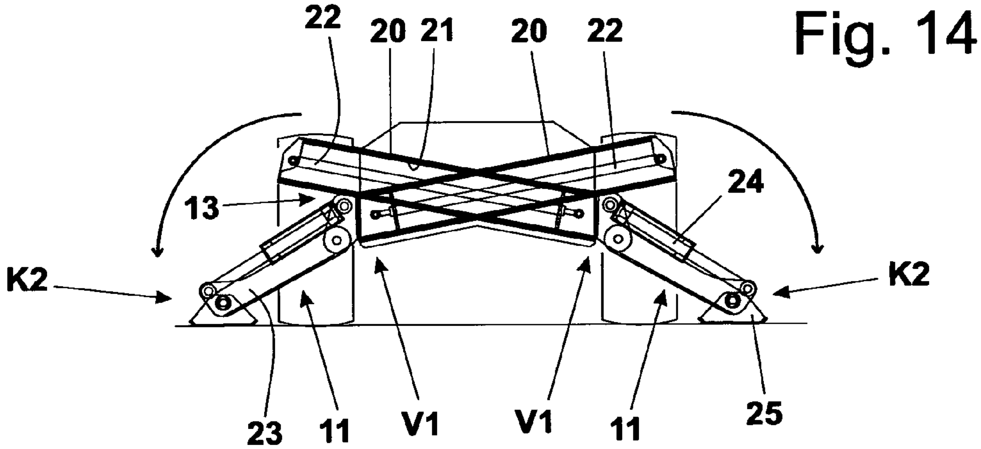
FIG. 14 is a view similar to that of FIG. 13 with the stabilizer devices partially withdrawn.
Figure 15:
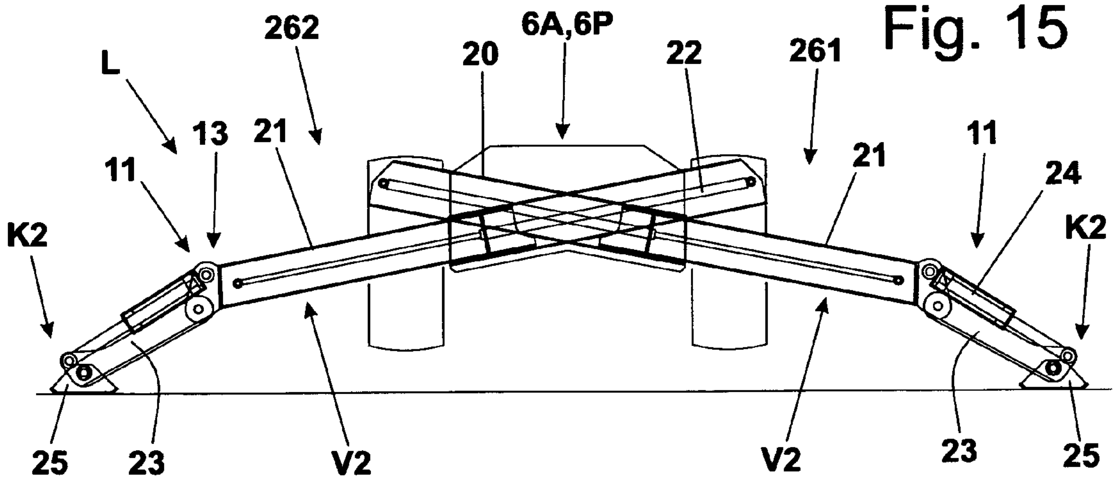
FIG. 15 is a view similar to that of FIG. 13 with the stabilizer devices completely withdrawn.
Figure 17:
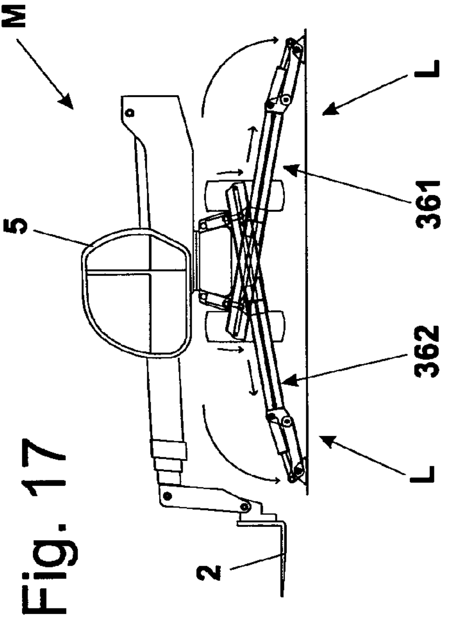
FIG. 17 is a front view of the machine of FIG. 16, with the upper turret in a different position.
Figure 16:
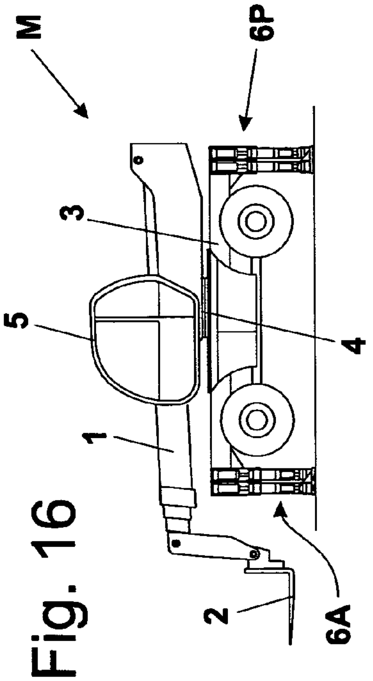
FIG. 16 is a side schematic view of an operating machine, provided with the stabilizer devices under discussion, according to a constructive version of the second embodiment, in operative position.

In the above mentioned second embodiment, the first module 10 of each stabilizer device 261, 262 is provided with said linear elongation means 12, and includes a stationary tubular element 20, inclined with respect to the horizontal, aimed at holding and guiding a sliding stem 21, operated by a relative first actuator 22, for example a hydraulic jack, between an inner position V1 (FIGS. 13, 14) and an outer position V2 (FIG. 15).

The foregoing second module 11, which in this case is associated to said sliding stem 21, is equipped with compass elongation means 13 and includes a relative oscillating arm 23, articulated to the outer end of said sliding stem 21, operated by a relative second actuator 24, for example a hydraulic jack, between a raised position K1 (FIG. 13) and a lowered position K2 (FIGS. 10, 11, 12, 14, 15).

A resting foot 25, aimed at abutting on the ground, is freely articulated to the end of said oscillating arm 23.

Figure 13:
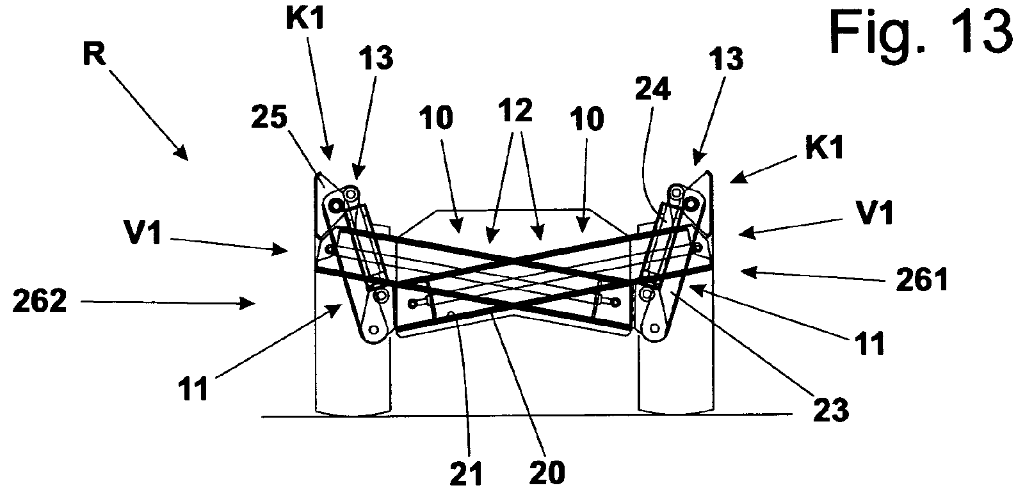
FIG. 13 is a front schematic view of a pair of stabilizer devices like those in FIGS. 10, 11, 12, in rest position.

FIG. 13 shows the above mentioned retracted inactive position R of the stabilizer devices 261, 262, with the respective sliding stems 21 in their inner position V1 and the relative oscillating arms 23 raised in their position K1.

FIG. 14 shows an intermediate position between said inactive position R and the operation position L (FIG. 15); when they are in the latter, said sliding stems 21 are in their outer position V2 and the mentioned oscillating arms 23 are in their lowered position K2.

As it is pointed out in FIG. 12, the width Y of the so defined resting base is bigger than its length X.

In the mentioned variant of the second embodiment, the first module 10 of each stabilizer device 361, 362 is provided with said linear elongation means 12, and includes a tubular member 30, aimed at holding and guiding a sliding stem 21, the latter being identical with the previous one. The tubular member 30 is carried oscillating on a vertical plane transversal to the frame 3 of the machine M, and is subjected to the action of a power means 31, for example a hydraulic jack, aimed at defining, for the same tubular element 30, a horizontal inactive position J1 (FIG. 19) and an inclined operative position J2 (FIGS. 20, 21).

Figure 20:
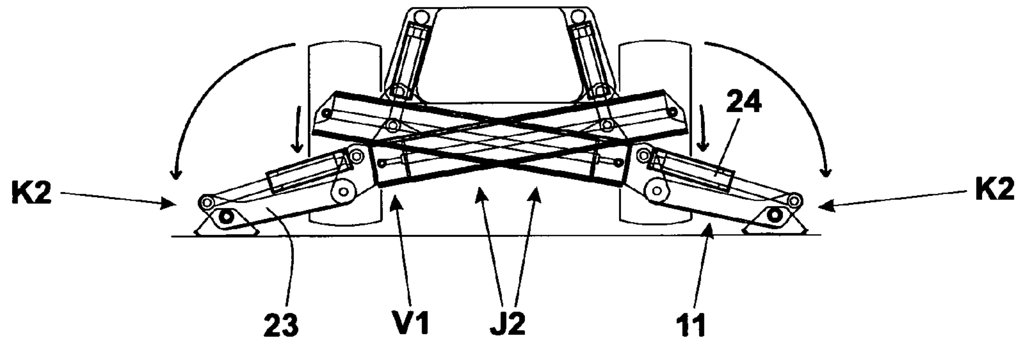
FIG. 20 is a view similar to that of FIG. 19 with the stabilizer devices partially withdrawn.
Figure 21:
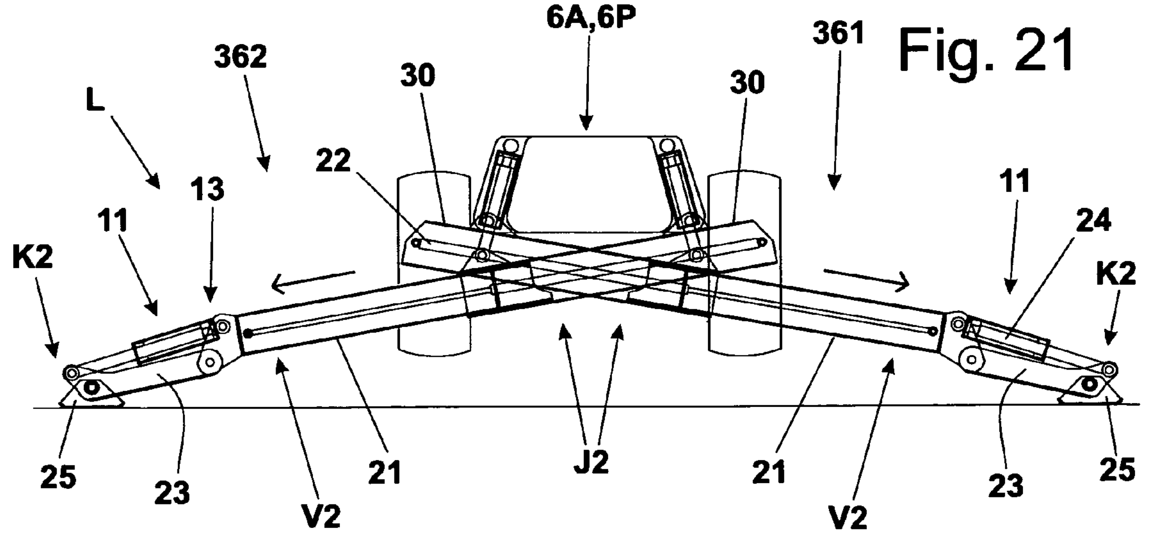
FIG. 21 is a view similar to that of FIG. 19 with the stabilizer devices completely withdrawn.

The sliding stem 21 also in this case is operated by a relative first actuator 22, for example a hydraulic jack, between an inner position V1 (FIGS. 19, 20) and an outer position V2 (FIG. 21).

The second module 11, still associated to said sliding stem 21, is equipped with compass elongation means 13 and includes a relative oscillating arm 23, articulated to the outer end of said sliding stem 21, operated by a relative second actuator 24, for example a hydraulic jack, between a raised position K1 (FIG. 19) and a lowered position K2 (FIGS. 16, 17, 18, 20, 21).

A resting foot 25, aimed at abutting on the ground, is freely articulated to the end of said oscillating arm 23.

Figure 19:
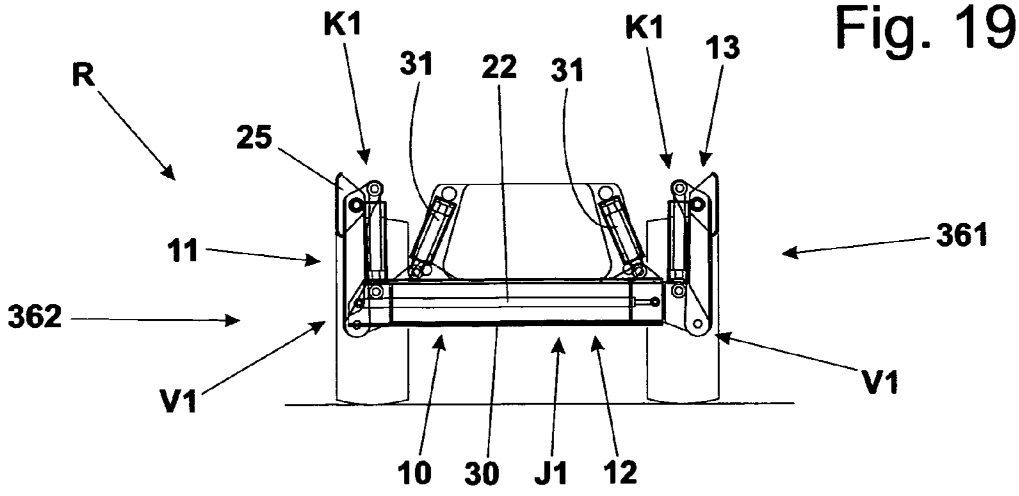
FIG. 19 is a front schematic view of a pair of stabilizer devices like those in FIGS. 16, 17, 18, in rest position.

FIG. 19 shows the above mentioned retracted inactive position R of the stabilizer devices 361, 362, with the respective tubular elements 30 in their horizontal inactive position J1, the corresponding sliding stems 21 in their inner position V1 and the relative oscillating arms 23 raised in their position K1.

FIG. 20 shows an intermediate position between the mentioned inactive position R and the operation position L, in which the tubular elements 30 are in their inclined operative position J2, the corresponding sliding stems 21 are in their inner position V1 and the relative oscillating arms 23 are in their lowered position K2.

FIG. 20 shows the withdrawn operation position L of the stabilizer devices 361, 362, with said sliding stems 21 being translated in their outer position V2 and the mentioned oscillating arms 23 in their lowered position K2.

As it is pointed out in FIG. 18, the width Y of the so defined resting base also in this case is bigger than its length X.

It appears with extreme obviousness from the above description, how all the embodiments proposed for the stabilizer device under discussion are capable of obtaining an increase of the resting base width, such as to make it exceed the relative length for the type of vehicles considered, in accordance with the prefixed object.

This important advantage allows, with other conditions being equal, to stabilize a maximum load greater with respect to the one acceptable by the stabilizer devices of known type, in particular maintaining full safety when the lifter arm and load are oriented crosswise with respect to the machine.

The proposed stabilizer device keeps the feature to remain within the maximum size limits, when it is inoperative, with obvious advantages for the machine mobility.

The conformation of the foregoing stabilizer device, in cooperation with the other devices already installed on the operating machine, allows an exact horizontal arrangement of the latter to be easily obtained, ensuring its optimal placing.

The described embodiments are all conceived with the intention of achieving the maximum strength, reliability and safety.

Anyway, it is understood that what above has illustrative and not limiting purpose, therefore, further embodiment variants or detail modifications, that could become necessary to be applied to what has been described, are considered from now on within the same protective scope defined by the claims reported below.

The invention claimed is:

1. A stabilizer device for an operating machine, with the latter equipped with a frame having a first and a second pair of said stabilizer devices mounted to the front and rear ends thereof respectively, in each stabilizer device pair the stabilizer devices being set symmetrical and crosswise to said frame, so that corresponding resting feet are turned outwardly, in opposite directions with respect to the longitudinal midline of the frame, said stabilizer device pairs being designed, when in operation position, to define a supporting base having length equal to the longitudinal distance between the same stabilizer device pairs, and having width equal to the transverse distance between the resting feet of each of the same stabilizer device pairs, each of said stabilizer devices comprising at least a first and a second module, interconnected with each other, one of which is provided with linear elongation means, whereas the other is provided with compass elongation means, the above mentioned linear and compass elongation means being adapted to be operated in phase relation to define a retracted inactive position, in which the corresponding resting foot is lifted from the ground and the bulk of said stabilizer device is within the above mentioned machine maximum size limits, and an extended operation position, in which said resting foot contacts the ground, at a predetermined distance from the longitudinal midline, characterized in that: the first module is equipped with said linear elongation means and includes a tubular element, designed to hold and guide a sliding stem, operated by a relevant first actuator between an inner position and an outer one; said tubular element is carried in oscillating fashion by a vertical plate crosswise to the machine frame, and is subjected to the action of a power means designed to define, for the same tubular element, a horizontal inactive position and an inclined operative one; said second module is associated to said sliding stem, it is equipped with said compass elongation means and includes an oscillating arm, articulated to an outer end of said sliding stem and operated by a relevant second actuator, between a raised position and a lowered one; said resting foot is freely articulated to an end of said oscillating arm; the above mentioned retracted inactive position of said stabilizer device is defined when said tubular element is in said inactive horizontal position, with said sliding stem in said inner position and said oscillating arm in said raised position; the above mentioned extended operation position of said stabilizer device is defined when said tubular element is in said inclined operation position, with said sliding stem in said outer position and said oscillating arm in said lowered position.

2. A stabilizer device as in claim 1, characterized in that the width measure of the supporting base is approximately equal or greater than the length measure.

3. A stabilizer device as in claim 1, characterized in that:

the first module is equipped with said compass elongation means and includes a stationary vertical plate, set crosswise to said frame of the machine and to which an arm is articulated, so as to oscillate from a raised position to a lowered position, due to operation of a respective first actuator; said second module is associated to said arm, and is equipped with said linear elongation means and includes a slip-off member, supported coaxially by the same arm and operated by a respective second actuator, between an inner position and an outer one; said resting foot is freely articulated to the end of said slip-off member; the above mentioned retracted inactive position of said stabilizer device is defined when said arm is in said raised position and said slip-off member is in said inner position; the above mentioned extended operation position of said stabilizer device is defined when said arm is in said lowered position and said slip-off member is in said outer position.

4. A stabilizer device as in claim 1, characterized in that: the first module is equipped with said linear elongation means and includes a stationary tubular element, designed to hold and guide a sliding stem, operated by a relevant first actuator between an inner position and an outer one; said second module is associated to said sliding stem, is equipped with said compass elongation means and includes an oscillating arm, articulated to an outer end of said sliding stem and operated by a relevant second actuator, between a raised position and a lowered one; said resting foot is freely articulated to the end of said oscillating arm; the above mentioned retracted inactive position of said stabilizer device is defined when said sliding stem is in said inner position and said oscillating arm is in said raised position; the above mentioned extended operation position of said stabilizer device is defined when said sliding stem is in said outer position and said oscillating arm is in said lowered position.

5. A stabilizer device as in claim 4, characterized in that said stationary tubular element is inclined with respect to a horizontal plane.

* * * * *